United States Patent [19]

Buysch et al.

[11] Patent Number: 5,064,899

[45] Date of Patent: * Nov. 12, 1991

[54] ANTISTATIC, THERMOPLASTIC MOULDING COMPOUNDS BASED ON AROMATIC VINYL POLYMERS

[75] Inventors: Hans-Josef Buysch; Norbert Schön, both of Krefeld; Herbert Eichenauer, Dormagen; Karl-Heinz Ott, Leverkusen; Alfred Pischtschan, Kuerten, all of Fed. Rep. of Germany

[73] Assignee: Bayer Aktiengesellschaft, Leverkusen-Bayerwerk, Fed. Rep. of Germany

[*] Notice: The portion of the term of this patent subsequent to Jun. 13, 2007 has been disclaimed.

[21] Appl. No.: 497,817

[22] Filed: Mar. 22, 1990

Related U.S. Application Data

[63] Continuation of Ser. No. 151,284, Feb. 1, 1988, abandoned.

[30] Foreign Application Priority Data

Feb. 13, 1987 [DE] Fed. Rep. of Germany ....... 3704485

[51] Int. Cl.$^5$ .................... C08G 63/48; C08G 63/91
[52] U.S. Cl. ........................................ 525/64; 525/67
[58] Field of Search .................................. 525/64, 67

[56] References Cited

U.S. PATENT DOCUMENTS

| | | | |
|---|---|---|---|
| 3,110,695 | 12/1963 | Ceresa | 525/284 |
| 4,029,720 | 6/1977 | Seiler et al. | 260/887 |
| 4,435,541 | 3/1984 | Brandstetter et al. | 525/64 |
| 4,588,773 | 5/1986 | Federl et al. | 525/64 |
| 4,719,263 | 1/1988 | Barnhouse et al. | 525/187 |

Primary Examiner—Marion E. McCamish
Assistant Examiner—Susan Berman
Attorney, Agent, or Firm—Connolly and Hutz

[57] ABSTRACT

Thermoplastic moulding compounds composed of 99.8-95% by weight of A) 0-100% by weight of a graft polymer B) 100-0% by weight of a thermoplastic polymer of vinyl monomers and 0.2 to 5% by weight of a polyalkylene ether which has been grafted with a polymer of $C_1$–$C_6$ alkyl acrylates, cycloalkyl acrylates or methacrylates and optionally styrene or $\alpha$-methyl styrene.

3 Claims, No Drawings

ANTISTATIC, THERMOPLASTIC MOULDING COMPOUNDS BASED ON AROMATIC VINYL POLYMERS

This application is a continuation of application Ser. No. 151,284, filed Feb. 1, 1988, now abandoned.

This invention relates to antistatic, thermoplastic moulding compounds based on optionally rubber modified polymers of aromatic vinyl compounds such as styrene and/or α-methyl styrene and acrylonitrile and/or acrylates, containing, as antistatic agent, a polyether which has been modified with polymers of acrylates and optionally other vinyl monomers.

Most synthetic materials are electric insulators with high electric surface resistance by virtue of their chemical constitution. They therefore readily accumulate an electrostatic charge on their surfaces when processed and in use. This results in numerous difficulties in practice, e.g. the synthetic material parts rapidly become dirty and dusty with the formation of characteristic dust figures on the surface. This applies particularly to optionally rubber modified polymers of aromatic vinyl compounds and acrylonitrile used as moulding compounds, e.g. styrene-acrylonitrile copolymers (SAN) and graft polymers of styrene and acrylonitrile on polybutadiene (ABS).

It is known to provide antistatic finishes for such moulding compounds. Substances which are recommended as antistatic agents include, for example, alkyl and aryl sulphonates (DE-OS 1 544 652), amines (DE-PS 1 258 083), quaternary ammonium salts, amides, phosphoric acids and alkyl and aryl phosphonates.

Moulding compounds which have been treated with such antistatic agents are still unsatisfactory in some respects. Many of the antistatic agents mentioned are comparatively ineffective and must be used in high concentrations. Moreover, many of these low molecular compounds migrate to the surface so that the moulded parts treated with such compounds frequently have uneven and patchy surfaces or even surface deposits. In many cases, mechanical properties such as the dimensional stability under heat are also severely impaired.

Pure polyethers which have been recommended as high molecular weight antistatic agents, e.g. in DE-PS 1 244 398, must be used in quantities of about 5% by weight or more if they are to provide a reliable antistatic finish for styrene polymers. This results in patchy and smeary surfaces even to the point of surface deposits on the finished products.

Although the antistatic effect may be improved by the graft polymerisation of styrene and acrylonitrile on such polyethers, as described in EP-A-O 061 692, styrene polymers containing such antistatic agents show yellow to brown discolourations when processed at temperatures above 150° C.

It has been found that antistatic agents which are highly effective for aromatic vinyl polymers without impairing the mechanical properties, the surface properties, the colour or the thermostability of these vinyl polymers may be obtained by grafting polyalkylene ethers with' $C_1$-$C_6$ alkyl acrylates, cyclo alkyl acrylates or methacrylates and optionally styrene or α-methyl styrene in addition.

The present invention accordingly relates to antistatic, thermoplastic moulding compounds consisting of I. 99.8-95% by weight, preferably 99-97% by weight, of an optionally rubber modified polymer of aromatic vinyl compounds, other vinyl monomers and conventional additives and II. 0.2 to 5.0% by weight, preferably 1.0-3.0% be weight, of a polyalkylene ether which has been grafted with a polymer of $C_1$-$C_6$ alkyl acrylates, cyclo alkyl acrylates or methacrylates and optionally styrene or α-methyl styrene in addition.

The invention further relates to a process for the antistatic finishing of optionally rubber modified polymers of aromatic vinyl compounds and other vinyl monomers, characterized in that from 0.2 to 5% by weight, preferably from 1.0 to 3.0% by weight, of a polyalkylene ether which has been grafted with a polymer of $C_1$-$C_6$ alkyl acrylates, cyclo alkyl acrylates or methacrylates and optionally styrene or α-methyl styrene in addition are added to such polymers.

Optionally rubber modified copolymers of aromatic vinyl compounds and other vinyl monomers (I) in the context of the present invention are mixtures of (A) from 0-100% by weight of one or more graft polymers and (B) from 100-0% by weight of one or more thermoplastic vinyl polymers.

Graft polymers (A) in the context of this invention are those in which resin forming monomers such as styrene, α-methyl styrene, methyl methacrylate or a mixture of 95 to 50% by weight of styrene, α-methyl styrene, nuclear-substituted styrene, methyl methacrylate or mixtures thereof and 5-50% by weight of (meth)acrylonitrile, maleic acid anhydride, N-substituted maleimides or mixtures thereof are graft polymerised on a rubber. Virtually all rubbers having glass transition temperatures below 10° C. are suitable for this purpose. Examples include polybutadiene, polyisoprene, styrene-butadiene copolymers, acrylonitrile-butadiene copolymers, acrylic rubbers, EPM rubbers (ethylene/propylene rubbers) and EPDM rubbers (ethylene/propylene/diene rubbers) containing an unconjugated diene such as hexa-1,5-diene or norbornadiene in small quantities. Diene rubbers are preferred.

The graft copolymers (A) contain form 10 to 95% by weight, in particular from 20-70% by weight, or rubber and from 90 to 5% by weight, in particular from 80 to 30% by weight, or graft copolymerised monomers. The rubbers are present in these graft copolymers in the form of at least partially crosslinked particles having an average particle diameter ($d_{50}$) of from 0.05 to 20.0 μm, preferably from 0.1 to 2.0 μm and most preferably from 0.1 to 0.8 μm. Graft copolymers of this type may be prepared by radical graft copolymerisation of styrene, α-methyl styrene, nucleo substituted styrene, (meth) acrylonitrile, methyl methacrylate, maleic acid anhydride or N-substituted maleimide in the presence of the rubbers which are to be grafted. Emulsion, solution, solvent free and suspension polymerisation are preferred methods of preparation.

The copolymers (B) also termed thermoplastic matrix resins can be synthesized from the graft monomers for (A) (resin forming monomers) or similar monomers by polymerisation, in particular they may be synthesized from styrene, α-methyl styrene, halogenated styrene, acryonitrile, methacrylonitrile, methyl methacrylate, maleic acid anhydride, vinyl acetate, N-substituted maleimide or mixtures thereof. The copolymers preferably consist of 95-50% by weight of styrene, α-methyl styrene, methyl methacrylate or mixtures thereof and 5-50% by weight of acrylonitrile, methacrylonitrile, methyl methacrylate, maleic acid an hydride or mixtures thereof, Copolymers of this type are also formed as by products of the graft copolymerisation. It is customary to add separately prepared copolymers in addition to the copolymers contained in the graft polymer.

These additional copolymers need not be chemically identical to the ungrafted resin components present in the graft polymers.

Suitable separately prepared copolymers are resinous, thermoplastic and free from rubber. Examples include in particular copolymers of styrene and/or α-methyl styrene with acrylonitrile, optionally mixed with methyl methacrylate.

Particularly preferred copolymers consist of 20 to 40% by weight of acrylonitrile and 80 to 60% by weight of styrene or α-methyl styrene. Copolymers of this type are known and may be prepared in particular by radical polymerisation, especially by emulsion, suspension, solution or solvent free polymerisation. The copolymers preferably have molecular weights of from 15,000 to $2 \cdot 10^5$.

The grafted polyethers (II) used for the present invention are prepared by radical polymerisation of 5 to 50% by weight, preferably 10 to 30% by weight, of $C_1$-$C_6$ alkyl acrylates, cyclo alkyl acrylates, $C_1$-$C_6$-alkyl methacrylates, cycloalkyl methacrylate and optionally styrene or α-methyl styrene in the presence of 95 to 50% by weight, preferably 90 to 70% by weight, of a poly alkylene ether.

Any commercially available radical starters may be used for polymerisation, e.g. diacyl peroxides, peresters, dialkyl peroxides, hydro peroxides and aliphatic and araliphatic azo compounds. Preferred radical starters such as axo-iso-butyronitrile, di-tert-butyl peroxide, tert-butyl perbenzoate, dicumyl peroxide and 1,3-bis-(tert-butyl-peroxy-isopropyl) benzene start polymerisation sufficiently rapidly at temperatures of from 60 to 140° C. Dibenzoyl peroxide is particularly preferred.

The polyalkylene ethers which are to be grafted according to the invention are built up of di- and polyfunctional (cyclo)aliphatic residues and may also contain a small amount of olefinic groups. Examples of suitable polyalkylene ethers include the reaction products of di- or polyols, ethylene glycol, 1,2-propylene glycol, trimethylol propane, glycerol, pentaerythritol, sorbitol and mannitol and one or more alkylene oxides such as ethylene oxide and propylene orxide. (For methods of preparation and use see Ullmanns Encyklopadie der technischen Chemie, 4th Edition, Volume 19, Page 31, Verlag Chemie, Weinheim 1980). Polyalkylene glycols containing high proportions of 1,2-propylene structures are preferred.

Both straight chained and branched polyalkylene glycols may be used, moderately branched types being preferred.

The polyalkylene glycols which are to be grafted according to the invention have molecular weights of from 500 to 15,000, preferably from 1,000 to 10,000 and most preferably from 2,000 to 5,000.

The $C_1$-$C_6$ alkyl acrylates, and cycloalkyl acrylates and methacrylates suitable for use as monomers for the graft polymers may contain functional groups, e.g. 2-hydroxy ethyl(meth)acrylate and 3-hydroxypropyl(meth)acrylate may be used. Methyl methacrylate, ethyl acrylate, butylacrylate, cyclo hexyl acrylate, benzyl acrylate and 2-ethyl hexyl acrylate are preferred.

Styrene and α-methyl styrene may be used in addition to these acrylate monomers.

The polyalkylene ethers which have been modified by grafting are generally medium viscosity to high viscosity, almost clear liquids or colourless suspensions.

Polyalkylene ethers which have been grafted according to the invention are incorporated into the polymers which require antistatic treatment by known methods, e.g. by kneading the components together or by rolling or extrusion. In addition to the antistatic agents according to the invention, the usual additives, such as pigments, fillers, stabilizers, lubricants, mould release agents, flame retardants and the like may be added to the moulding compounds.

The moulding compounds prepared as described above are worked up into finished products such as housing parts for domestic and electric equipment, profile parts, internal fittings for motor vehicles, foils and films, etc. by the usual methods employed for thermoplasts, e.g. injection moulding.

The finished moulded products are distinguished by their excellent antistatic properties and their glossy, homogeneous surfaces which are free from deposits. The mechanical properties such as dimensional stability under heat and impact strength, including the impact strength at low temperatures, are virtually unimpaired compared with those of the unmodified material. In particular, the colour and thermo-stability of the polymer material are not adversely affected by the antistatic agents according to this invention.

EXAMPLES

Component I:

Polymer I-A a) 60 parts by weight of a styrene/acrylonitrile copolymer composed of 72 parts by weight of styrene and 28 parts by weight of acrylonitrile and having a limiting viscosity number $\pi_i=55$ (ml/g) (determined in dimethyl formamide at 23° C.) and b) 40 parts by weight of a graft polymer of 36 parts by weight of styrene and 14 parts by weight of acrylonitrile on 50 parts by weight of particulate polybutadiene obtained by polymerisation of the monomers in the presence of a mixture of 50% by weight of polybutadiene latex having an average particle diameter ($d_{50}$) of about 100 nm and 50% by weight of a similar latex having an average particle diameter of about 400 nm.

Polymer I-B composition same as I-A but coloured black with 1% by weight of carbon black.

Polymer I-C a) 77.5 parts by weight of a copolymer of 72 parts by weight of α-methyl styrene and 28 parts by weight of acrylonitrile having a limiting viscosity $\pi_i=53$ (ml/g) (determined in dimethyl formamide at 20° C.) and b) 22.5 parts by weight of the graft polymer used in I-A.

Polymer I-C is coloured black with 1% by weight of carbon black.

Polyether II

General Method of Preparation

A vinyl monomer or a mixture of several vinyl monomers is added dropwise with exclusion of air at 95°-100° C. to a polyether and dibenzoyl peroxide (about 1% by weight) in the course of 2 to 3 hours and the mixture is then polymerised for 5-6 hours at the same temperature.

Polyether II-a 25 parts by weight of methyl methacrylate are polymerised in the presence of 75 parts by weight of a polyhydroxypolyalkylene glycol (OH number=28) of trimethylol propane, propylene oxide (87 parts) and ethylene oxide (13 parts).

Polyether II-b 15 parts by weight of ethyl acrylate are polymerised in the presence of 85 parts by weight of the polyalkylene glycol used for II-a.

Polyether II-c 10 parts by weight of methylmethacrylate were polymerised in the presence of 90 parts by weight of a straight chained polypropylene oxide having an average molecular weight of 2,000.

Polyether II-d 30 parts by weight of butyl acrylate were polymerised in the presence of 70 parts by weight of the polyalkylene glycol used for II-c.

Polyether II-e 25 parts by weight of methyl methacrylate were polymerised in the presence of 75 parts by weight of a polyhydroxypolyalkylene glycol (OH number=28) of sorbitol, propylene oxide (82 parts) and ethylene oxide (18 parts).

Polyether II-f

A mixture of 13 parts by weight of methyl methacrylate and 13 parts by weight of styrene were polymerised in the presence of 74 parts by weight of the polyalkylene oxide used for II-e.

Polyether II-g 25 parts by weight of methylmethacrylate were polymerised in the presence of 75 parts by weight of a polyhydroxypolyalkylene glycol (OH number=46) of trimethylol propane, propylene oxide (85 parts) and ethylene oxide (15 parts).

Polyether II-h (for Comparison)

10 parts by weight of styrene and 10 parts by weight of acrylonitrile were polymerised in the presence of 80 parts by weight of the polyalkylene glycol used for II-a.

Antistatic Agent II-i (for Comparison)

Tris-hydroxyethylated dodecylamine.

Polyether II-k (for Comparison)

The polyalkylene glycol used for II-c.
Incorporation of components II (polyethers) in components I:

Components I were commercial ABS polymers in the form of granulates.

The antistatic agents were weighed and added and homogenously distributed in the ABS polymer by kneading the components together in a Banbury type 3 liter internal kneader with melting The temperature rose to values of up to 210° C. within a kneading time of 3 to 5 minutes. The ejected melts (dolls) were rolled flat, cut up and granulated. Test samples were prepared by injection moulding by the usual method.

The antistatic characteristics were tested by laying out moulded parts measuring 155×75×2 (mm) in very dusty surroundings and observing the development of dust figures. (1 to several days, thereafter several weeks). The comparison sample which had not been treated with an antistatic finish and samples which had been treated with antistatic finishes according to the state of the art were included in each test series.

The same moulded part was used for assessing the surface quality (gloss, uniformity, formation of patches, formation of flow lines). Gloss measurement was carried out according to ASTM D 523 or DIN 67 530.

In some cases, a telephone casing was produced by injection moulding as a product suitable for practical purposes. The curved surfaces are useful for detecting slight differences in surface quality.

To test the thermo-stability, sample plates measuring 60×40×2 (mm) were injection moulded in (long) cycles of 75 seconds at mass temperatures rising from 220° C. to 280° C. The raw tone, colour changes and changes in surface appearance (e.g. the formation of silver streaks) were assessed visually.

The most important mechanical properties (impact strength and notched impact strength according to DIN 53 453, hardness according to DIN 53 456) as well as the Vicat softening temperature (B 120 according to DIN 53 460) which is an important developmental aim were determined on small standard test rods 50×6×4 (mm). The Vicat softening temperatures were given as difference values (Δ Vicat) obtained by comparison with polymers I-A to C which had not been treated with an antistatic finish.

For the sake of clarity, all test results in the tables are expressed by symbols. These have the following meanings:

+ =very good
(+)=good
| =with weaknesses
(−)=weak
− =unusable

The Table shows that the antistatic agents according to this invention have clear advantages over antistatic agents used for similar purposes according to the state of the art. For a comparable antistatic effect, they reduce the dimensional stability under heat to a much less extent and they result in products with improved thermo-stability and surfaces with less tendency to visible faults.

TABLE

| Example Number | Polymer I | Antistatic agent II | $C_{II}$ (% by weight) | Test Results ||||
|---|---|---|---|---|---|---|---|
| | | | | Thermo-stability | Surface Quality | Δ Vicat B (°C.) | Antistatic effects |
| 1 | A | — | — | + | + | 0 | — |
| 2 | B | — | — | | + | 0 | — |
| 3 | C | — | — | | (+) | 0 | — |
| Antistatic agents according to the invention ||||||||
| 4 | A | a | 1.0 | + | + | 0 | + |

TABLE-continued

| Example Number | Polymer I | Antistatic agent II | $C_{II}$ (% by weight) | Test Results | | | |
|---|---|---|---|---|---|---|---|
| | | | | Thermo-stability | Surface Quality | Δ Vicat B (°C.) | Antistatic effects |
| 5 | C | a | 1.5 | | (+) | 0 | + |
| 6 | A | b | 1.0 | + | + | −0.5 | (+) |
| 7 | B | b | 1.0 | | + | 0 | (+) |
| 8 | A | c | 1.0 | + | + | 0 | (+) |
| 9 | C | c | 1.5 | | (+) | −2 | + |
| 10 | A | d | 1.0 | + | + | −2 | + |
| 11 | A | e | 1.0 | + | + | −0.5 | + |
| 12 | B | e | 1.5 | | + | −0.5 | + |
| 13 | A | f | 1.0 | + | + | −0.5 | + |
| 14 | B | f | 1.0 | | + | −1 | (+) |
| 15 | A | g | 1.0 | | + | −2 | + |
| Antistatic agents not according to the invention | | | | | | | |
| 16 | A | h | 1.0 | − | (+) | 0 | (+) |
| 17 | A | i | 1.0 | (+) | (+) | −3.5 | (+) |
| 18 | C | i | 1.0 | | (+) | −5 | + |
| 19 | A | k | 1.0 | | (+) | −4 | (+) |

We claim:
1. Thermoplastic moulding compositions comprising:
    I. 99.8 to 95% by weight of
        A) 0-100% by weight of one or more graft polymers comprise the monomers styrene, α-methyl styrene, methyl methacrylate, or a mixture of 95-50% by weight of styrene, α-methyl styrene, ring substituted styrene, methyl methacrylate or mixtures thereof with 5-50% by weight of methacrylonitrile, acrylonitrile, maleric acid anhydride, N-substituted malerimides or mixtures thereof, grafted onto a rubber substrate, and
        B) 100 to 0% by weight of one or more thermoplastic vinyl polymers, and
    II. 0.2 to 5% by weight of a grafted polyalkylene ether which is 90-70%, by weight of polyalkylene ether grafted with 10-30% by weight of a polymer of $C_1$-$C_6$ alkyl acrylates or cycloalkylacrylates or methacrylates.

2. Thermoplastic moulding compositions according to claim 1, wherein I is a mixture of
    (A) a graft polymer of styrene and acrylonitrile on polybutadiene and
    (B) a styrene and acrylonitrile copolymer.

3. Thermoplastic moulding compositions according to claim 1, wherein II is a graft of 0 to 30% by weight of a $C_1$-$C_6$-alkyl acrylate, a cycloalkyl acrylate, a $C_1$-$C_6$ alkyl methacrylate, a cycloalkylmethacrylate or mixture thereof onto 90 to 70% by weight of a polyalkylene ether having a molecular weight of from 500-15000.

* * * * *